United States Patent
Omtzigt

(10) Patent No.: US 11,681,650 B2
(45) Date of Patent: *Jun. 20, 2023

(54) EXECUTION ENGINE FOR EXECUTING SINGLE ASSIGNMENT PROGRAMS WITH AFFINE DEPENDENCIES

(71) Applicant: Stillwater Supercomputing, Inc., El Dorado Hills, CA (US)

(72) Inventor: Erwinus Theodorus Leonardus Omtzigt, El Dorado Hills, CA (US)

(73) Assignee: Stillwater Supercomputing, Inc., El Dorado Hills, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 17/333,909

(22) Filed: May 28, 2021

(65) Prior Publication Data
US 2021/0286756 A1 Sep. 16, 2021

Related U.S. Application Data

(63) Continuation of application No. 16/372,069, filed on Apr. 1, 2019, now Pat. No. 11,030,146, which is a continuation of application No. 15/683,510, filed on Aug. 22, 2017, now Pat. No. 10,289,606, which is a continuation of application No. 14/828,470, filed on Aug. 17, 2015, now Pat. No. 9,767,071, which is a continuation of application No. 14/185,841, filed on Feb. 20, 2014, now Pat. No. 9,501,448, which is a continuation-in-part of application No. 12/467,485, filed on May 18, 2009, now Pat. No. 8,688,956.

(Continued)

(51) Int. Cl.
G06F 15/82 (2006.01)
G06F 15/173 (2006.01)
G06F 15/80 (2006.01)

(52) U.S. Cl.
CPC ...... G06F 15/825 (2013.01); G06F 15/17381 (2013.01); G06F 15/8023 (2013.01)

(58) Field of Classification Search
CPC .... G06F 15/82; G06F 15/825; G06F 15/8023; G06F 15/17381
See application file for complete search history.

(56) References Cited

U.S. PATENT DOCUMENTS 8,688,956 B2 * 4/2014 Omtzigt ............ G06F 15/17381
                                                   712/18
9,501,448 B2 * 11/2016 Omtzigt .............. G06F 15/8023
(Continued)

FOREIGN PATENT DOCUMENTS

WO WO-9324888 A1 * 12/1993 ............. G06F 13/14

*Primary Examiner* — William B Partridge
(74) *Attorney, Agent, or Firm* — Haverstock & Owens, A Law Corporation

(57) ABSTRACT

The execution engine is a new organization for a digital data processing apparatus, suitable for highly parallel execution of structured fine-grain parallel computations. The execution engine includes a memory for storing data and a domain flow program, a controller for requesting the domain flow program from the memory, and further for translating the program into programming information, a processor fabric for processing the domain flow programming information and a crossbar for sending tokens and the programming information to the processor fabric.

35 Claims, 8 Drawing Sheets

Related U.S. Application Data

(60) Provisional application No. 61/130,114, filed on May 27, 2008.

(56) References Cited

U.S. PATENT DOCUMENTS

| | | | |
|---|---|---|---|
| 9,767,071 B2 * | 9/2017 | Omtzigt | .............. G06F 15/8023 |
| 10,289,606 B2 * | 5/2019 | Omtzigt | ............ G06F 15/17381 |

* cited by examiner

FIG. 5A: Packet Example

510

| 0 | | 31 |
|---|---|---|
| Packet ID 511 | | Queue ID 519 |
| Stream ID 512 | Recurrence ID 513 | Data Type 514 |
| Signature 515 | | |
| Data Value 516 | | |
| Routing Vector 517 | | |

FIG. 5B: Data Token Example

520

| 0 | | 31 |
|---|---|---|
| Stream ID 512 | Recurrence ID 513 | Data Type 514 |
| Signature 515 | | |
| Data Value 516 | | |

FIG. 5C: Instruction Token Example

530

| 0 | | 31 |
|---|---|---|
| Instruction Opcode 531 | Slot Cover 532 | Slot Occ 533 |
| Stream ID 512 | Recurrence ID 513 | Data Type 514 |
| Signature 515 | | |
| Operand A 534 | | |
| Operand B 535 | | |
| Operand C 536 | | |

FIG. 7A: System of recurrence equations $$( (x,y) \mid 1 <= x,y <= N ) \{$$

$$v_{i,j} = v_{i,j-1}$$
$$m_{i,j} = M_{j,i}$$
$$w_{i,j} = w_{i-1,j} + m_{i,j} * v_{i,j}$$
$$\}$$

EXECUTION ENGINE FOR EXECUTING SINGLE ASSIGNMENT PROGRAMS WITH AFFINE DEPENDENCIES

CROSS-REFERENCE TO RELATED APPLICATIONS

This application is a continuation application of co-pending U.S. patent application Ser. No. 16/372,069, filed on Apr. 1, 2019 and titled "EXECUTION ENGINE FOR EXECUTING SINGLE ASSIGNMENT PROGRAMS WITH AFFINE DEPENDENCIES," which is a continuation application of U.S. patent application Ser. No. 15/683,510, filed on Aug. 22, 2017 and titled "EXECUTION ENGINE FOR EXECUTING SINGLE ASSIGNMENT PROGRAMS WITH AFFINE DEPENDENCIES," which is a continuation application of U.S. patent application Ser. No. 14/828,470, filed on Aug. 17, 2015 and titled "EXECUTION ENGINE FOR EXECUTING SINGLE ASSIGNMENT PROGRAMS WITH AFFINE DEPENDENCIES," which is a continuation application of U.S. patent application Ser. No. 14/185,841, filed on Feb. 20, 2014 and titled "EXECUTION ENGINE FOR EXECUTING SINGLE ASSIGNMENT PROGRAMS WITH AFFINE DEPENDENCIES," which is a continuation-in-part application of U.S. patent application Ser. No. 12/467,485, filed May 18, 2009, (now U.S. Pat. No. 8,688,956), and titled, "EXECUTION ENGINE FOR EXECUTING SINGLE ASSIGNMENT PROGRAMS WITH AFFINE DEPENDENCIES" which claims the benefit of U.S. Provisional Patent Application Ser. No. 61/130,114, filed May 27, 2008 and titled "EXECUTION ENGINE"; which are all hereby incorporated by reference in their entireties for all purposes.

FIELD OF THE INVENTION

The present invention relates to the field of computer systems, and in particular to the efficient execution of fine-grained parallel instructions.

BACKGROUND OF THE INVENTION

A typical general purpose computer is configured as a sequential instruction stream processor, which fetches instructions from memory, decodes, and executes these instructions. The sequential instruction stream processors use energy very inefficiently with more energy consumed in the instruction management than in the actual execution of the operation that the instruction represents. For example, modern general purpose x86 processors from Intel or AMD only attain 10% of peak performance as measured by the operational throughput of the processor on important algorithms such as sparse matrix solvers.

Furthermore, these sequential instruction stream processors are very inefficient for fine-grained parallel computation. In the aforementioned sparse matrix solver, performance requirements typically require that thousands of processors are used concurrently. To coordinate execution among groups of processors, much time and energy is wasted when some processors finish before others and subsequently need to wait to synchronize with the rest of the processors.

The algorithms for which the general purpose computer is becoming less and less efficient are of vital importance to science, engineering, and business. Furthermore, the exponential growth of data and computational requirements dictates that groups of processors are used to attain results in a reasonable amount of time. Many of the important algorithms such as signal processing, solvers, statistics, and data mining, exhibit fine-grained parallel structure. Mapping these algorithms on networks of general purpose processors is becoming problematic in terms of size, cost, and power consumption.

SUMMARY OF THE INVENTION

The present invention is an apparatus for the efficient execution of highly parallel fine-grain structured computations. The apparatus is programmable to perform efficient execution on a wide variety of such structured computations. Energy consumption in a computer is proportional to the number of instructions executed and data operands needed. In an electronic implementation of a computer, this implies that energy consumption is proportional to time and distance instructions and data need to travel. This invention generates a physical model of execution that honors spatial distances and the invention organizes the computation in such a way that contention among instructions is managed through a simple queuing system.

An apparatus in accordance with the present invention includes a processing element that receives data tokens from a fabric of processing elements and matches these to instruction tokens on the basis of a spatial tag. This tag creates spatial relationships between computations to reflect energy and temporal optimizations the algorithmic designer intended.

In some embodiments, the processing element fabric is supplied data tokens from a bank of data streamers, which transform data structures that are stored in computer memory into a stream of data tokens.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

FIG. 5A demonstrates one particular embodiment of a data packet.

FIG. 5B demonstrates one particular embodiment of a data token.

FIG. 5C demonstrates one particular embodiment of the instruction token.

FIG. 7A is an example of a single assignment form program for matrix-vector multiplication.

DETAILED DISCUSSION OF THE INVENTION

The following discussion sets forth numerous specific details to provide a thorough understanding of the invention.

Those of ordinary skill in the art having the benefit of this disclosure will appreciate that the invention may be practiced without these specific details. Various well known methods, procedures, components, and circuits have not been described in detail in order to focus attention on the features of the present invention.

Figure 7B:
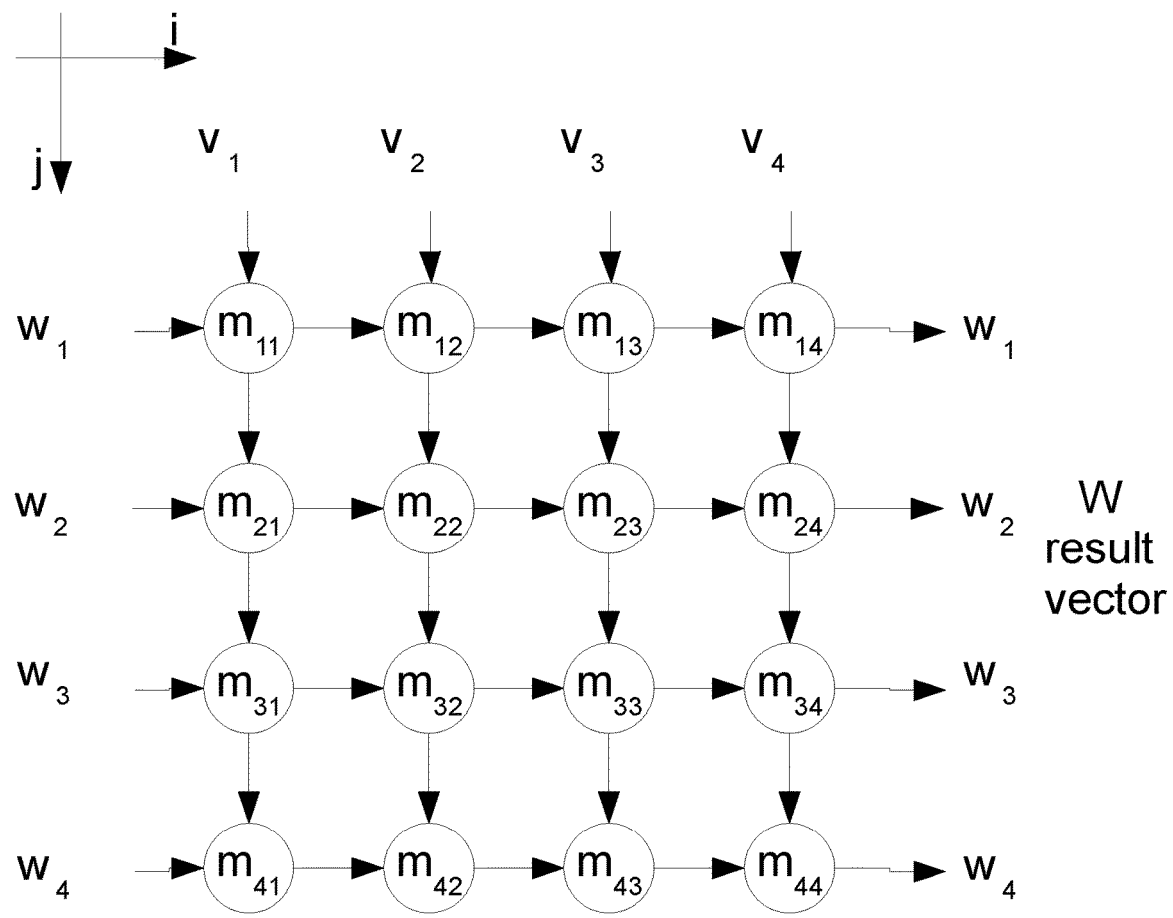
FIG. 7B shows the associated single assignment graph in two dimensions.

An execution engine executes single assignment programs with affine dependencies. Programs in single assignment form (SAF) are algorithms that express the computation as a set of equations where each assignment refers to a unique identifier. Typical expressions of single assignment programs are recurrence equations where the left hand side is interpreted as a unique identifier. Many algorithms have natural expressions in single assignment form. For example, FIG. 7A shows an example of a single assignment program for matrix-vector multiplication. FIG. 7B demonstrates the associated single assignment graph, which is a data flow graph where nodes represent computations and edges represent data movement.

A skilled operator in the field understands that single assignment programs and the terms "dependence graph" and "reduced dependence graph" are interchangeable. Furthermore, in the compiler literature, the definition of a control flow graph is well established. A control flow graph represents all paths that might be traversed through a program during its execution. Thus, if a program includes a collection of single assignment programs, they may communicate their inputs and outputs directly or indirectly. As a compiler analyzes such a program, it represents this knowledge in a control flow graph. Again, a skilled operator in the field understands that a program can be represented by a control flow graph and that the terms represent the same entity.

Since the engine executes a collection of single assignment programs communicating potentially through a Random Access Memory, then by the interchangeable nature of the terms "single assignment program" and "reduced dependency graph," and the a priori knowledge that a program is able to be represented by a control flow graph, then it logically flows that a "domain flow program" is able to be defined as "the reduced dependency graph of a set of coupled affine recurrence equations plus the control graph that couples dependency graphs that originate and terminate in the Random Access Memory."

As described herein, the "program" is described as a "domain flow program" that represents the computation through dependency graphs and domains of computation. From the operation of the machine, it is clear that this machine executes on the basis of the data flow execution model, not the stored program model. It differs from the traditional data flow machine by the "program" representation, which includes spatial tags that are interpreted as points in an abstract multi-dimensional lattice. What makes a program a "domain flow" program is the representation of the "fine-grain structured" computation in terms of dependency graphs and domains of computation.

Additionally, described herein is that the recurrence equations, and by equivalence, single assignment programs, are valid only on their 'domain of computation'. As the fabric has a collection of these domains active during operation, and the input of these domains 'flow' from a Random Access Memory, through the fabric, to the Random Access Memory, this describes a flow of domains, or otherwise stated, a domain flow. The program that represents this domain flow can thus be identified as a domain flow program that includes a set of coupled affine recurrence equations, which can be represented by reduced dependency graphs, with input domains that originate in Random Access Memory and terminate in Random Access Memory. The description of such flows are important components in compilers and the compiler literature uses the term 'control flow graphs' to refer to these descriptions. Logically, these descriptions introduce the concepts of a domain flow program as a set of coupled affine recurrence equations that the literature equates with dependency graphs or reduced dependency graphs, and that are represented by a control flow graph that describes the coupling of these single assignment programs and how these domain flows originate and terminate in Random Access Memory.

The same way a program is able to include a collection of subprograms, a single assignment program is able to include one or more single assignment subprograms. By applying this subdivision on the domain flow program recursively, it ends up with the nodes in the control flow graph, each equivalent to some set of affine recurrence equations defined over a domain of computation. As described herein, data tokens belonging to different recurrence equations are organized by their identifier, their domain of computation, a signature update function, and a routing vector. Thus, the organization of data tokens in terms of communicating affine recurrence equations that can be succinctly described by a domain flow program is described including the concept of data tokens belonging to the same single assignment equation as being disambiguated by their identifier and their index in the domain of computation. Also described herein is the process of one or more processing elements producing output streams, which are series of data tokens that belong to the same recurrence equation disambiguated by an identifier and defined over a domain of computation.

In FIG. 7A, an example is given of a system of recurrence equations, which is equivalent to a coupled set of affine recurrence equations as the recurrence equation defining the w recurrence is dependent, or coupled, with the recurrence equation defining the v recurrence. Furthermore, the notion of dependence graphs to represent these systems of recurrence equations is to capture the coupling between the recurrence equations. If these equations were not coupled the dependence graph would include only of nodes representing the single assignment recurrences.

Any program is able to be expressed in single assignment form. Programs with fine-grain structured parallelism are most naturally expressed in single assignment form because single assignment form algorithms are maximally parallel formulations that do not have any explicit sequencing to schedule execution. This allows the execution environment to focus on how to manage resource contention. A program in single assignment form contains a unique assignment for each operation. This is able to be represented by a single assignment graph (SAG) that contains a node for every operation and an edge for every data movement. A computational event is defined as some operation taking right hand side operands and computing the assignment on the left hand side of the equation.

Because of the limited speed of signal propagation, any two concurrent computational events are separated either in time or in space. By embedding a single assignment form program in an abstract lattice, defined as a discrete subgroup of RN that spans it as a real vector space, an algorithm designer is able to specify spatial distance between dependent computations. In some embodiments, the embedding is accomplished in an abstract orthonormal lattice. An orthonormal lattice is defined by an orthonormal basis; all basis vectors have unit length, and their inner products are zero. The single assignment graph is able to be embedded in the lattice with the rule that no dependent computational events are able to reside at the same lattice point. This will assign each computational event a unique location in the lattice and separate dependent computations by physically separated lattice points, thus making explicit the temporal separation for communicating the dependent operands. This unique location in the lattice is called the signature of the computational event, and it is defined as the index vector identifying the lattice point in the lattice. Other examples of appropriate lattices would be crystal groups and other discrete samplings of space that are defined by some regular cell that generates a cover of space. There are well defined mathematical structures describing these samplings called lattice groups. Orthonormal lattices are a subset of these more general lattice groups.

After embedding the SAG in some lattice, all program inputs and all computational events have an explicit routing vector that defines how results are delivered to the dependent computational events. This routing vector is called the dependency vector since it specifies how computational instructions depend on their inputs. The embedding in a spatial lattice allows the algorithm designer to incorporate constraints such as distance and resource contention. Distance is very important for power efficiency and performance since both energy consumption and time to communicate a dependent operand is directly proportional to distance. Distance here is defined in terms of hops in a discrete routing network so each hop needs to go through at least one register thus consuming energy proportionally to the number of hops.

The execution engine described herein is an efficient execution engine for above-mentioned embedded single assignment programs embedded in an abstract spatial lattice.

Figure 1:
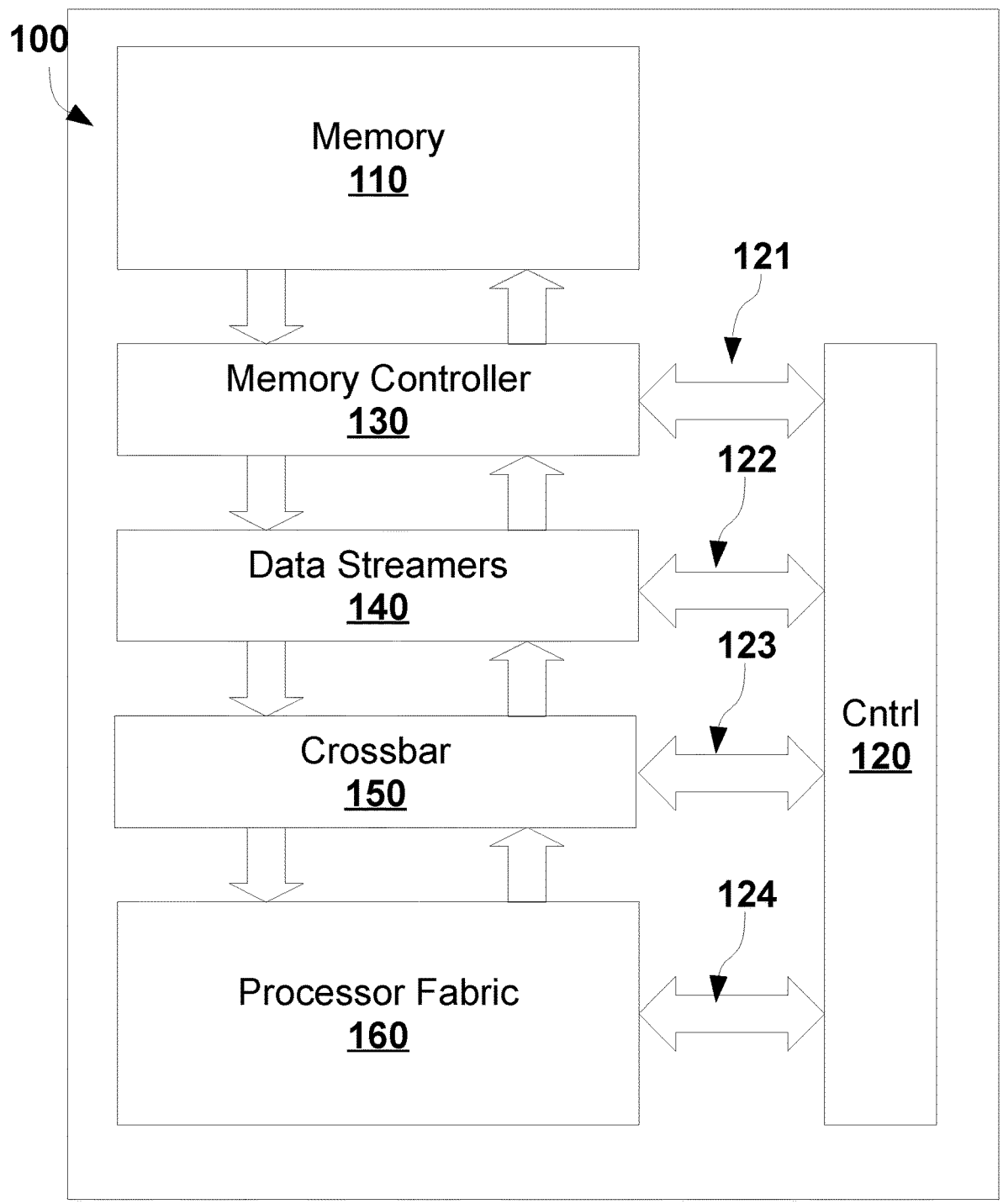
FIG. 1 is a block diagram of a generalized data flow computer system that operates according to some embodiments.

Referring first to FIG. 1, there is shown a block diagram of a generalized data flow computer system that operates according to some embodiments. The computer system 100 includes a memory 110 that contains the data and the program to execute. The memory 110 is able to be any applicable type of memory. Execution starts by the controller 120 requesting a program from the memory 110. The controller 120 presents a read request via bus 121 to the memory controller 130 which translates the read request to a memory request and returns the data to the controller 120. This data contains the program instructions to execute a single assignment program. The controller 120 decodes these program instructions and translates them into programming information for the streamers 140, and are delivered to the streamers 140 via a control bus 122. Concurrently, the controller 120 sends programming information for the processor fabric 160 through a command bus 123 to the crossbar 150. The crossbar 150 delivers the programming information including commands to the proper rows and columns of the processor fabric 160 which reads these commands and configures itself to execute the single assignment program. Once the overall data path is set up, the controller 120 issues an event to the streamers 140 to start. The memory controller 130 receives read and write requests from the streamers 140 and transforms them into memory requests. On read requests from the streamers 140, data is delivered by the memory controller 130 to the streamers 140 and forwarded to the crossbar 150. The crossbar 150 routes the data streams to the appropriate rows or columns in the processor fabric 160. The processor fabric 160 receives the incoming data streams, executes instructions on these streams and produces output data streams. These output data streams are written back to memory 110 by traversing the crossbar 150 to the streamers 140 that associate memory addresses to the data streams, and then present them to the memory controller 130, which will write the data streams into memory 110. Once the streamers identify completion of the computational task, notifier events are sent back to the controller 120 via the control bus 122. Command/event buses 123 and 124 are used to communicate interrupts and other events back to the controller 120 to signal errors, panics, and operational information that the controller is able to use to interrupt or otherwise steer the computation.

Figure 2:
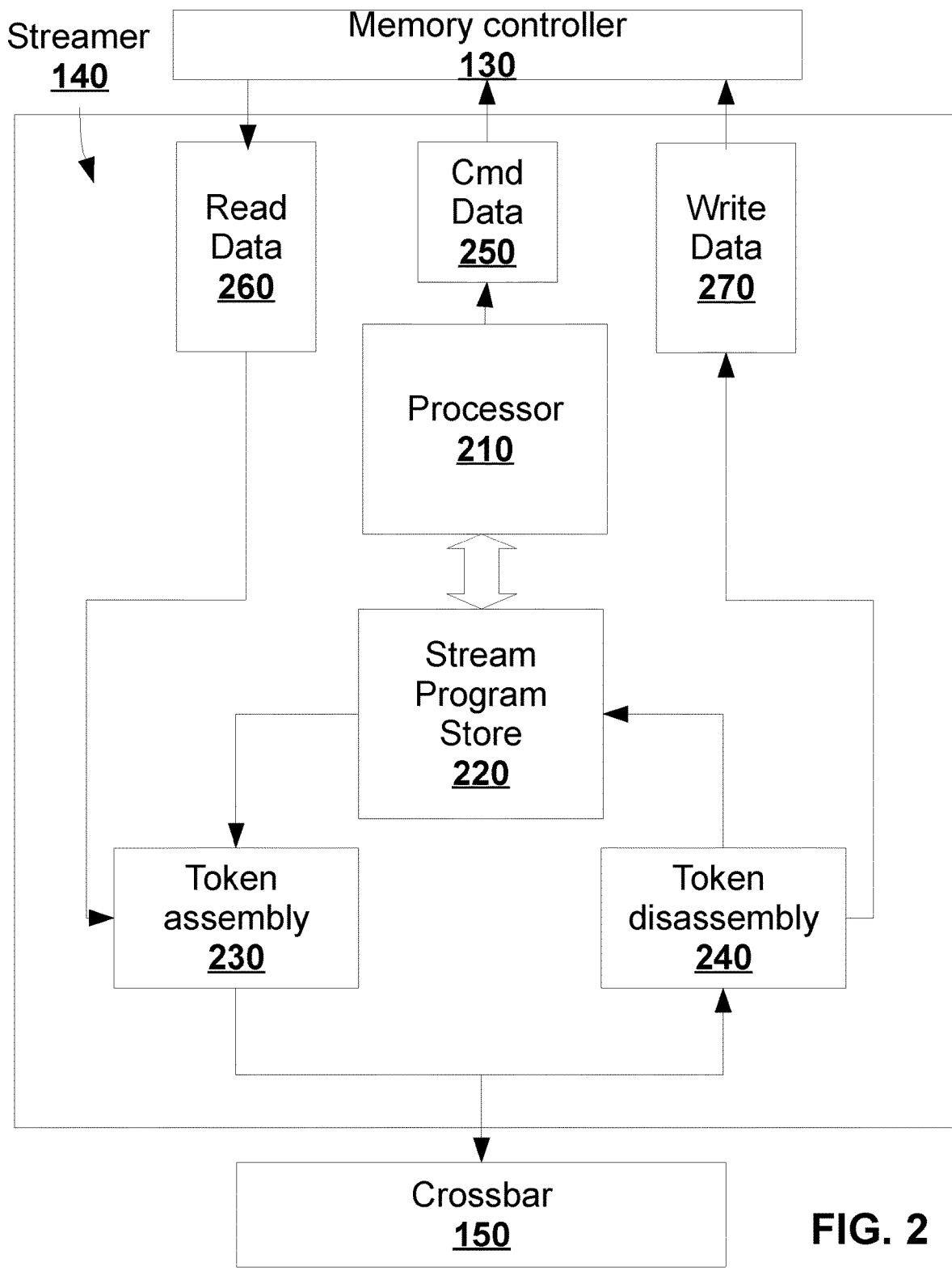
FIG. 2 is a block diagram of a data streamer according to some embodiments.

Referring now to FIG. 2, there is shown a block diagram of a data streamer 140. A data streamer executes a stream program that assembles and/or disassembles a data token stream. The process starts by the controller 120 decoding a single assignment program and transforming this program into stream programs for the streamers 140. The controller 120 writes this stream program to the stream program store 220 via a control bus 122. A stream program details how to calculate request addresses and other attributes such as size and type. The stream program is executed by the processor 210. The processor 210 executes the stream program and produces memory controller commands which are written into the command data queue 250. As part of the same stream program, processor 210 also produces the associated token attributes recurrence identifier, signature, and data type. Those attributes are consumed by the token assembly unit 230, which combines these attributes with read data 260 that is coming from the memory controller 130, to produce a data token stream that is written to the cross bar 150. Similarly, for data streams that come from the crossbar 150 and that need to be written back to memory, the token disassembly unit 240 strips the token attributes recurrence identifier, signature, and data type from the incoming data token and writes them in the stream program store 220 for further processing by the processor 210. The token disassembly unit 240 writes the data payload of the data token into the write data queue 270. Concurrently, the processor 210 executes a write stream program to generate the proper memory write commands which are, with the write data, presented to the memory controller 130.

Figure 3:
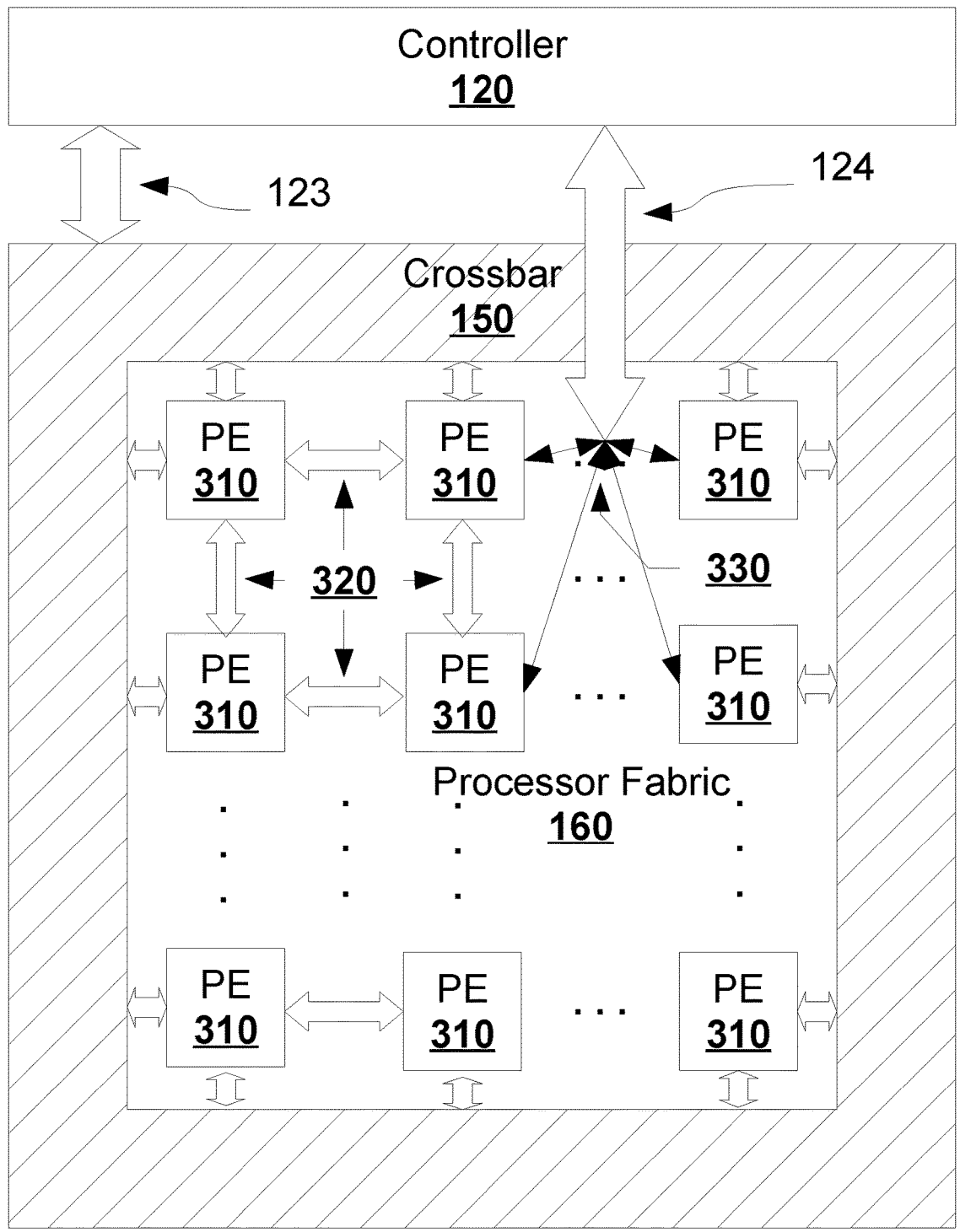
FIG. 3 is a block diagram of the processor fabric according to some embodiments.

Referring now to FIG. 3, the crossbar 150 provides an interconnection network to connect N data streamers to M processing elements (PE) 310 in the processor array. The streamers 140 transform a flat data structure in memory into a multidimensional data stream in time. The crossbar 150 connects the physical position of any streamer to one, many, or all physical positions of the processing elements in the processor fabric 160. The processor fabric 160 consumes these multidimensional data streams and connects them together inside the fabric under the control of the single assignment program that controller 120 read from memory and installed in the processing elements of the processor fabric through an instruction token stream written on bus 123 that uses the crossbar 150 to connect to the appropriate processing elements 310. The multidimensional data streams flow through the processing elements 310 and the processing element routing network 320. The PEs 310 process instruction and data tokens. Instruction and data tokens are able to be routed and stored in the PE 310. The single assignment program describes how data tokens combine in some multi-dimensional space. The PEs 310 recognize the spatial tag called the signature of a computational event and take action under control of the single assignment program installed in their program store by controller 120. The action is to compare the signature of an incoming data token with the signatures of instruction tokens that accumulate in the PEs 310 during execution, and extract the data token from the internal network 320 if there is a match. The overall computation represented by the single assignment program evolves as the multi-dimensional data streams match up within the processing elements 310 and produce potentially new multi-dimensional data streams, representing intermediate results, which are propagated through the routing network 320 to their computational event destination in the processor fabric. Final result data streams are streamed back to the crossbar 150 via the routing network 320 and the PEs 310 under the control of the single assignment program stored in the PEs 310. The crossbar 150 presents these data streams back to the appropriate streamers 140 which transform them into flat data structures again that are able to be written to memory 110. During the execution of the single assignment program error conditions are able to occur, or it may be of interest to observe processing events so that the controller 120 is able to better manage the computation. Examples of program errors are floating point exceptions like underflow or overflow, instruction exceptions like division by zero, or panic events like resource depletion or time outs. Because the routing network 320 is able to be negatively affected by such conditions and to provide better guarantees for delivery and handling of critical events, there is a separate communication network 330 for such events that is connected by a bidirectional bus 124 to the controller 120. The bidirectional event bus 124 is used by the processor fabric 160 and the controller 120 to collect, aggregate, and steer the computation that is evolving inside the processor fabric 160.

Figure 4:
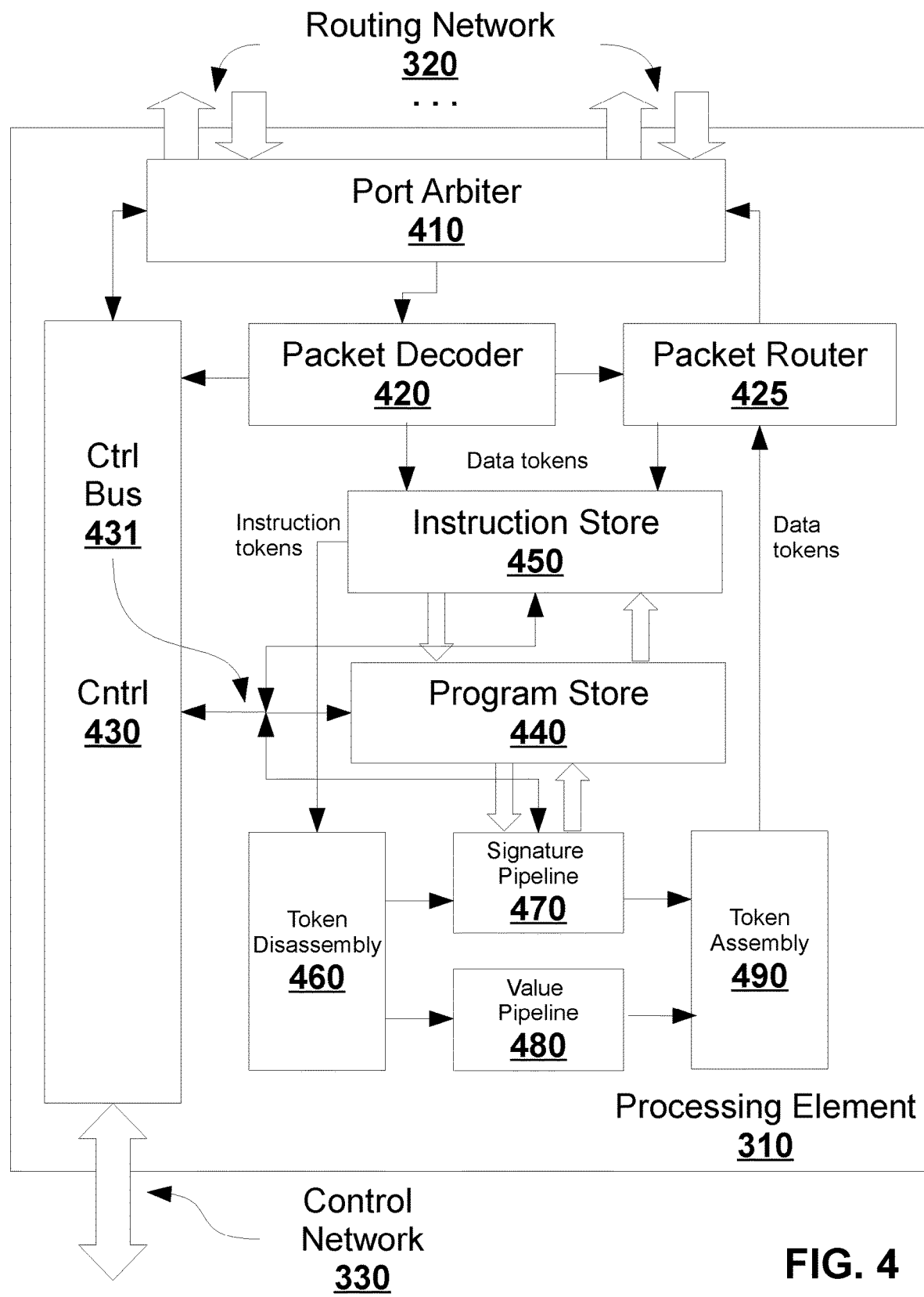
FIG. 4 is a block diagram of the processing element according to some embodiments.

The structure of the processing element 310 is depicted in FIG. 4. Before the start of a computation in the processor fabric 160, the controller 120 writes control information regarding the single assignment program into the PE's program store 440. The information written into the program store 440 includes an identifier to disambiguate recurrence equations, a domain of computation on which the recurrence equation is active, a signature update program, and a routing vector. The domain of computation is a specification, typically a constraint set defined by a system of inequalities. An example of such a constraint set is $\{(i,j)|1 \leq i,j \leq N\}$. This would be the domain of computation of the recurrence equation shown in FIG. 7. This constraint set is a system of four inequalities:
1. $i \geq 1$
2. $j \geq 1$
3. $i \leq N$
4. $j \leq N$ This system of inequalities can be described by the following matrix:

$$\begin{pmatrix} -1 & 0 & 1 & 0 \\ 0 & -1 & 0 & 1 \end{pmatrix} \begin{pmatrix} i \\ j \end{pmatrix} \leq \begin{pmatrix} -1 \\ -1 \\ N \\ N \end{pmatrix}$$

This constraint matrix and right hand side vector can be used as the normalized form to specify the constraint set for some embodiments. This program information is delivered to the PEs 310 through control packets that are injected into the processor fabric 160 by the controller 120. The port arbiter 410 of each PE 310 receives packets from the routing network 320. The port arbiter 410 selects one or more packets from the network ports of the PE 310 and forwards these packets to the packet decoder 420. The packet decoder 420 inspects the packet to determine if it contains programming or other type of control information. If the packet is a control packet, the packet decoder 420 sends the packet to the controller 430 which extracts the control information and programs the different elements of the data path, in particular, the program store 440 and the instruction store 450. The control and status information is written via the control bus 431. The program store 440 will receive for each recurrence equation that is part of the single assignment program, an identifier, a specification of a domain of computation, a signature update specification, and a routing vector. This information defines some affine recurrence equation which the PE 310 will help execute In general, the recurrence equation executes on multiple PEs 310, so it is more natural to state that the recurrence equation executes on the processor fabric 160. After the controller 120 is done programming the processor fabric 160, execution is able to commence. The execution starts with the data streamers 140 injecting the first data packets into the processor fabric 160 (via the crossbar 150) When data packets arrive on network ports of a PE 310, the packet arbiter 410 selects one or more packets and forwards them to the packet decoder 420. The packet decoder 420 inspects the packet to determine if it is a data packet that belongs to a computation that executes on that particular PE 310. If it does, the packet decoder 420 extracts the routing vector of the packet. If the routing vector is not null, the packet decoder 420 forwards the packet to the packet router 425. The packet router 425 computes the next leg in the route, updates the routing vector of the packet, and presents the updated packet to the port arbiter 410 to be injected back in the routing network 320. If the routing vector is null then the packet decoder 420 sends the data token to the instruction store 450. The instruction store 450 extracts the instruction tag from the data token and assigns the data payload to the appropriate operand slot in the associated instruction stored and pending in the instruction store 450, or it allocates a new instruction if this is the first data token received for this particular computational event. When a pending instruction has received all its operands, the instruction store 450 will deallocate the instruction from the pending instruction list and queue the instruction token for execution by sending it to the token disassembly unit 460. The instruction token includes the instruction opcode, the variable identifier of the recurrence equation, the signature of the computational event this instruction represents, and the constituent operands. The token disassembly unit 460 extracts the signature from the instruction token, and sends the signature with the variable identifier to the signature pipeline 470. The signature pipeline 470 looks up the variable identifier in the program store 440 to retrieve the signature update program to apply to the signature. The signature update program is a simple affine transformation on the incoming signature, which as indicated in the general description section, is able to be interpreted as a spatial index vector in some abstract lattice. The signature pipeline 470 applies this affine transformation to the incoming signature to produce a new signature. This new signature is forwarded to the token assembly unit 490. Concurrently with the execution of the signature pipeline, the value pipeline 480 executes the instruction to generate a new left hand side value. The token disassembly unit 460 extracts the instruction opcode and operands from the instruction token and forwards that to the value pipeline 480. The value pipeline 480 executes the instruction and forwards the result to the token assembly unit 490. The token assembly unit 490 takes the output of the signature pipeline 470 and the output of the value pipeline 480 and constructs a new data token. It checks the signature of this new data token against the domain of computation for this recurrence equation, and if inside the domain, it sends the data token to the packet router 425. If the routing vector is not the null vector, the packet router 425 embeds the data token into a packet and forwards that to the port arbiter 410 to be injected back into the routing network 320 under the control of some arbitration policy. Examples are first-come-first-served, or priority based schemes to implement quality-of-service guarantees. If the routing vector of the data token is null, it implies that the data token is recirculating inside the current PE 310 and the packet router 425 sends the data token to the instruction store 450 where it is matched up with an instruction.

Referring to FIG. 5A, there is shown one possible embodiment of the structure of data packets 510 flowing through the routing network 320. Data packets 510 flow through the routing network to deliver data values to the PEs 310. In this embodiment, the data packet 510 includes a packet identifier 511, a queue identifier 519, a stream identifier 512, a recurrence equation identifier 513, a data type 514, a signature 515, a data value 516, and a routing vector 517. The packet identifier 511 is a debug feature to help identify any computational errors. During the execution of a single assignment program on the fabric, thousands of packets are able to be in the system at any point in time. To be able to identify a specific packet in this collection requires that a unique identifier is carried. This information would be akin to debug information and instructions that are injected in the instruction stream of an instruction stream processor by its compiler to help debug functional problems in the code. During execution of release code, this unique packet identifier would not be part of the data packet.

Still referring to FIG. 5A, this exemplary data packet 510 is able to be used in a 2-dimensional processor fabric executing 4-dimensional single assignment programs. The 2-dimensional processor fabric would determine that the routing vector 517 is 2-dimensional and represents a Manhattan route to the destination PE 310. As described in the operation of the PE 310 a non-null routing vector would be detected by the packet decoder 420 and forwarded to the packet router 425 to be routed to the next PE 310 in the route. The 4-dimensional single assignment program would manifest itself in the signature 515 to be a 4-vector representing the 4 indices of 4-dimensional space. The signature 515 combined with the recurrence identifier 513 are very important in program execution according to the present invention. The recurrence identifier 513 and signature 515 uniquely identify one computational event in the single assignment program. The result of that computational event is stored in the data value slot 516, and its type is identified by the data type 514. To deliver the result to the next computational event it participates in, the network routes the data packet via the routing vector 517, and uses the queue identifier 519 to help the packet routers 425 in the PEs 310. Each recurrence equation gets assigned a unique queue ID by the compiler, which enables the packet routers to quickly queue incoming data packets with minimum decode hardware. Given the fact that in a fully active 2D routing mesh there are four concurrent incoming packets, the pressure on the front-end of the PE 310 is significant By carrying some of the queue information in the data packet, the hardware complexity of the packet router in the PE 310 is reduced. Finally, the stream identifier 512 is used to associate a data packet to a flat memory data structure. When the data streamers 140 generate multidimensional data streams from a flat memory data structure, the signature identifies the location within the data structure but the stream identifier 512 is needed to identify the data structure. This is akin to base addresses used in instruction stream processors where the program that executes on a memory data structure is specified relative to a base address. The stream identifier 512 enables the data streamers to properly identify where the data packet comes from and where it is going to in memory.

Now referring to FIG. 5B, there is shown one possible embodiment of the structure of a data token 520 that would be used with the data packet depicted in FIG. 5A. Data tokens 520 carry the minimum information needed for the instruction store 450 to identify which instruction this data element belongs to. As is able to be seen by comparing FIG. 5A and FIG. 5B, the data token 520 is completely contained within the data packet 510. The individual fields in the data token are the same fields as described in the data packet description above. This is a common structure among different embodiments since the data packets are really routing mechanisms to deliver data tokens throughout the processor fabric 160. By using the same structure between data packets and data tokens, the data tokens are able to be quickly assembled and disassembled, which reduces hardware complexity and improves performance both in terms of power as well as throughput and latency. The structure of the data token determines the detailed operation of the instruction store 450, which in many ways is able to be seen as the core control mechanism that enables execution of arbitrary single assignment programs arising from systems of affine recurrence equations. The instruction store 450 organizes data tokens and assembles and organizes instruction tokens pending execution. The instruction store 450 embodiment that belongs with the data token structure 520 as depicted in FIG. 5B is shown in FIG. 6.

Figure 6:
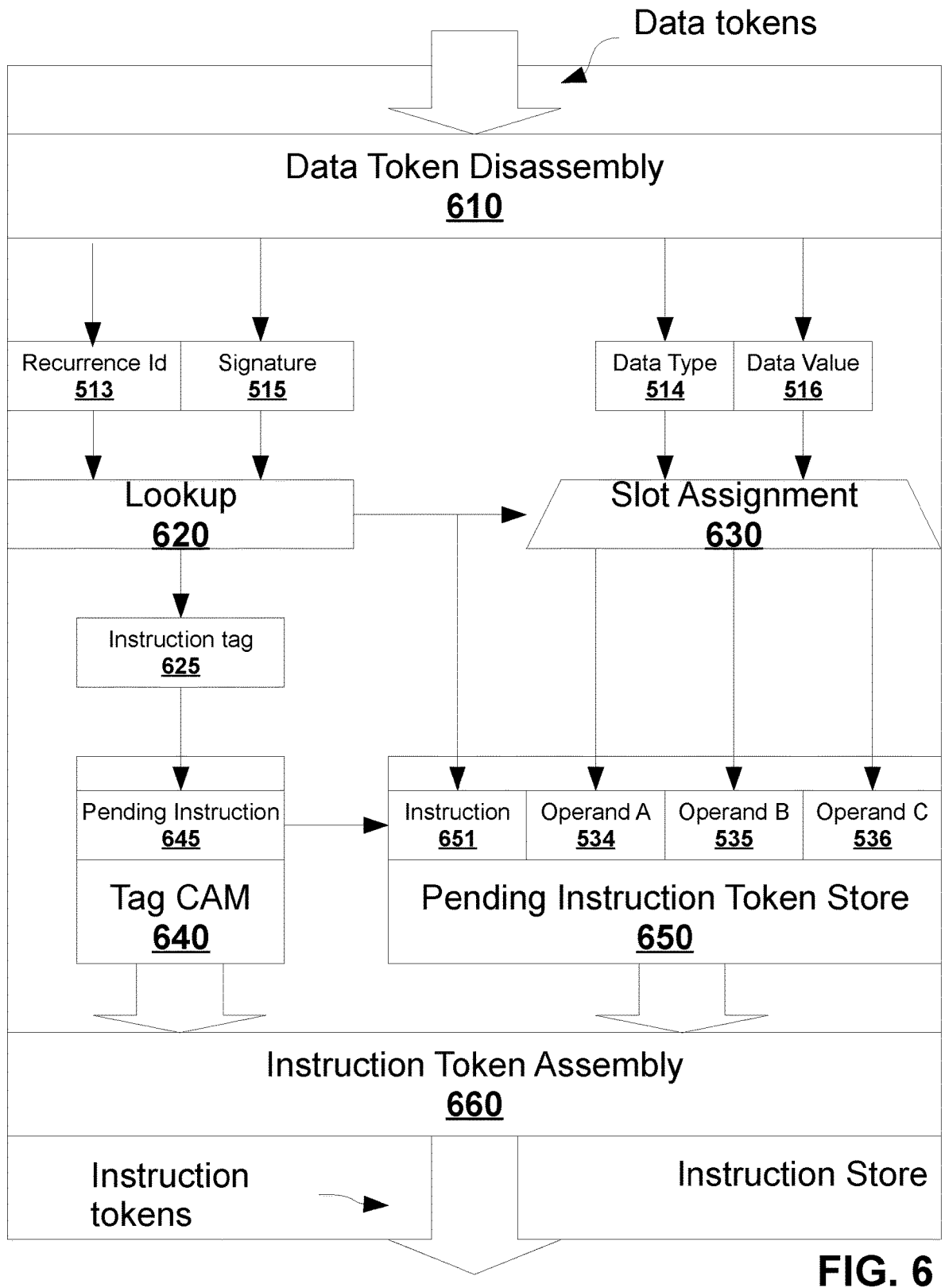
FIG. 6. is a block diagram of one particular embodiment of the instruction store.

Referring to FIG. 6, data tokens arrive at the data token disassembly unit 610. The data token disassembly unit 610 extracts the different fields of the data token. To identify the instruction to which this data token must be delivered, the data token disassembly unit 610 extracts the recurrence identifier 513 and the signature 515 from the data token and sends that to a lookup unit 620. The lookup unit 620 queries the program store 440, shown in FIG. 4 to retrieve the instruction information. The lookup unit 620 constructs an instruction tag 625 by simply combining the recurrence identifier 513 and the signature 515. This is a unique identifier for the computational event that this data token participates in. Additionally, the lookup unit 620 also receives information from the program store 440 about the slot location the data token occupies in the instruction. This information controls the slot assignment unit 630, which receives the data type 514 and the raw data value 516 from the data token disassembly unit and routes this to the appropriate slot in the pending instruction. The last function the lookup unit 620 performs is the construction of an instruction header 651, which contains information about how to manage the pending instruction in the pending instruction token store 650. Now referring back to FIG. 5C, there is shown an embodiment of an instruction token that is managed in the pending instruction token store 650. The instruction header 651 includes the instruction opcode 531, the slot cover 532, and the slot occupancy field 533. The instruction opcode 531 is a field that controls the functional units in the value pipeline 480. It encodes the type of operation that needs to be applied to the operands. Examples are the typical functional unit operators such as ADD, MULTIPLY or DIVIDE, or any logic operations such as MASK, BIT_TEST, or SHIFT The slot cover field 532 specifies how many operands the instruction requires. For example, for simple instructions, a single input operand is able to be used whereas for more complex instructions, a typical three operand structure is used. The slot cover field 532 and the slot occupancy field 533 work together in the pending instruction token store to determine if an instruction has received all its operands. The process that is used starts with the lookup unit 620 composing an instruction tag 625 and sending it to the tag CAM 640. The tag CAM 640 is a content addressable memory that is addressed by these instruction tags. When the tag CAM 640 indicates a miss, this implies that the instruction has not been yet allocated in the tag CAM 640, and on a miss, the tag CAM 640 will allocate a pending instruction. If the tag CAM 640 indicates a hit, this implies that there is a pending instruction to which the data token is able to be delivered. The tag CAM 640 provides a pointer into the pending instruction token store 650 to the storage associated with this pending instruction. The lookup unit 620 provides the instruction header 651 as previously described, and the slot assignment unit writes the data token value into the appropriate slot in the pending instruction. Furthermore, it will update the slot occupancy field 533 and compare it to the required slot cover 532. If the two are equal, all operands have been received and the instruction is ready for execution. The instruction tag 625 and the pending instruction 645 including fields 651, 534, 535, and 536, are send to the instruction token assembly unit 660, which will construct the instruction token 530 as shown in FIG. 5C The instruction token assembly unit 660 will forward completed instruction tokens to the execute units, starting with the token disassembly unit 460, as depicted in FIG. 4.

Figure 8:
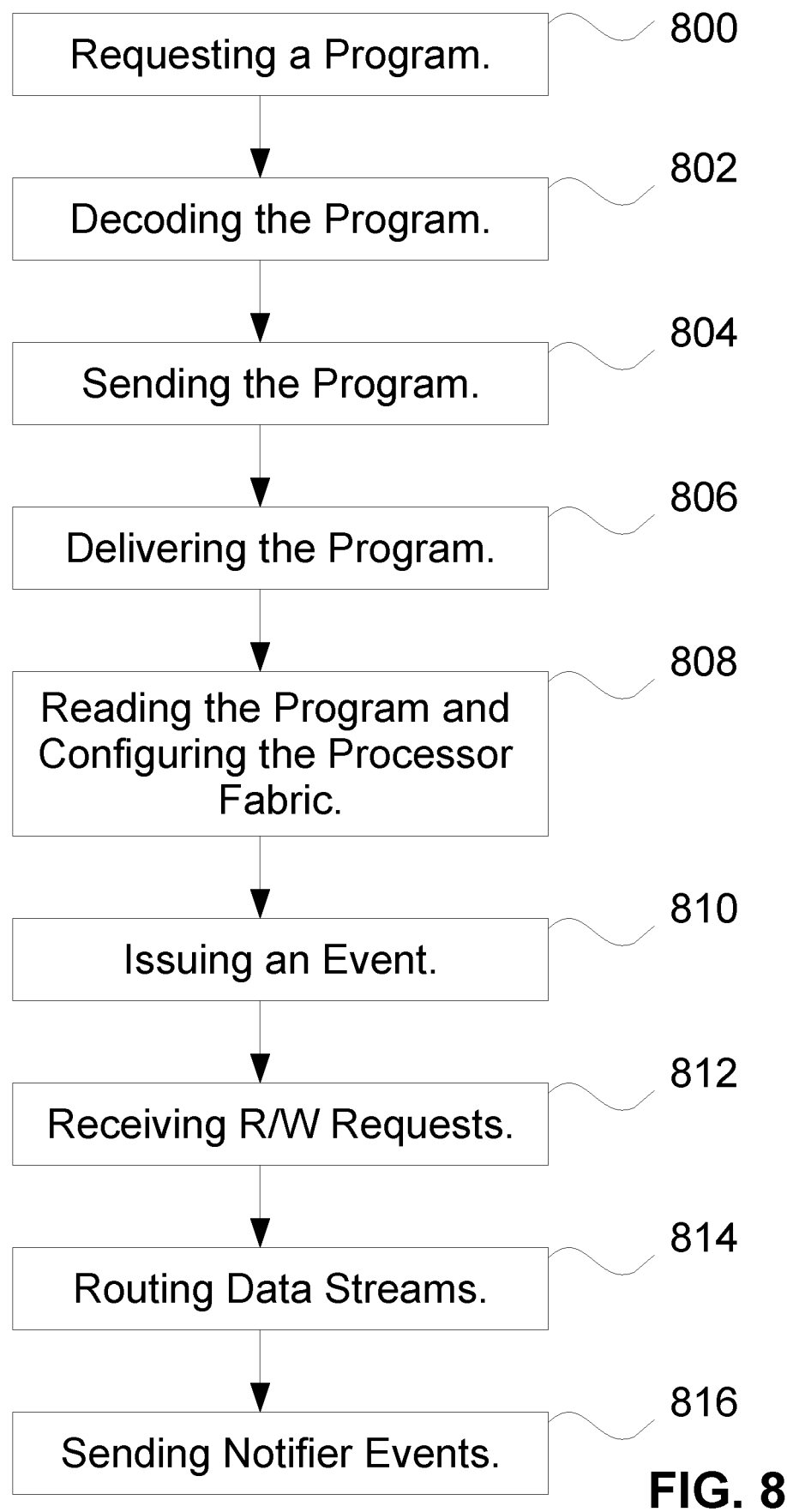
FIG. 8 illustrates a flowchart of a method of utilizing an execution engine.

FIG. 8 illustrates a flowchart of a method of utilizing an execution engine. In the step 800, a program is requested from a memory by a controller including presenting a read request to a memory controller which translates the read request to a memory request and returns data to the controller. The data contains program instructions to execute a single assignment program. In the step 802, the program instructions are decoded into programming information and translated and delivered to data streamers. In the step 804, the programming information is sent to a crossbar. In the step 806, the programming information is delivered from the crossbar to a processor fabric. In the step 808, the programming information is read, and the processor fabric is configured to execute the single assignment program. In the step 810, an event is issued from the controller to the streamers to start sending data streams once an overall data path is set up. In the step 812, read and write requests are received from the streamers, and the read and write requests are transformed into memory requests at the memory controller. In the step 814, data streams are routed by the crossbar to rows or columns in the processor fabric for executing instructions on the streams and producing output data streams, wherein the output data streams are written to the memory by traversing to the crossbar to the streamers that associate memory addresses to the data streams and then present the data streams to the memory controller which writes the data streams into the memory. In the step 816, notifier events are sent to the controller once the streamers identify completion of a computational task.

To utilize the execution engine, a user inputs and/or initiates a program to the execution engine, for example if the execution engine is implemented in a computer. The execution engine then executes the program as described above. Depending on the program, the program outputs a desired result. For example, if the user wants to perform a computationally complex mathematical equation, the output after the execution engine executes is the result of the equation.

In operation, by organizing the execution of the single assignment program in the form described herein, the execution engine has solved many problems encountered when using an instruction sequence processor. There is no instruction pointer that guides the execution. The execution engine is completely data driven. When data elements become available they trigger dependent computations Thus, the execution engine functions like a data flow machine. However, in a data flow machine, there is no spatial structure to take advantage of since the lookup is done on the basis of flat memory addresses. The second problem with the traditional data flow machine is that the CAM that holds the pending instructions needs to be very large to be able to execute a large scale program. Content addressable memories become less power efficient and slower when they become larger. The CAM has been the traditional bottleneck in a data flow machine because it cannot compete on performance with an instruction sequence processor using a von Neumann architecture. The execution engine includes spatial constraints added to the specification of the computation that the architecture honors, and thus energy constraints are able to be be captured in the program. Furthermore, the spatial constraints allow distribution of the CAM across all the processing elements, and thus the architecture scales again in terms of concurrency. As an example, a small instance of the execution engine is able to integrate 4096 processing elements on a single chip Each instruction store in the processing elements could contain 64 pending instructions for a total concurrency of 262144 instructions in a single chip. Typical concurrency measures in a 4 core chip multi processor are of the order of 100, and even highly parallel 256 processor graphics processing units are limited to concurrency measures of the order of 10000. With the execution engine, the ability to manage vasts amount of concurrency is unparalleled.

Core Engine

The basic execution method for domain flow programs, which are expressed as systems of affine recurrence equations is described herein. The recurrence is a mechanism to express the evolution of a complex calculation. Furthermore, the placement of the individual computational events in an abstract index space allows an algorithm designer to incorporate space and time constraints in the algorithmic expression. The nature of the Knowledge Processing Unit (KPU) core engine is that it allows the faithful execution of those fine-grain space and time constraints even under conditions of resource contention. The resource contention resolution of a von Neumann machine uses Random Access Memory to serialize intermediate results so that a computational sequence can share computational resources. In contrast, the KPU core engine described herein provides a bounded physical, but logically infinite computational fabric, and maps the recurrence on a path of computational resources in the fabric. Thus, the core engine represents the apparatus which can execute these systems of affine recurrence equations, honoring space-time constraints by interpreting the recurrence indices as locations in space-time, and the affine dependencies as physical communications between computational events which are mapped to a functional unit in the fabric. The application of this new method of execution for fine-grain parallel algorithms provides new opportunities to refine and optimize the method and apparatus for broader, or more specialized applications.

Instruction Set Architecture, or ISA

A typical system of recurrence equations will use a very small set of operators, that might radically differ between algorithms. For example, an algorithm for a Finite Difference Method, or FDM, might only need floating point ADDs and MULTs, potentially at different accuracies, whereas an algorithm for a Bloom filter for genomic read sequence renormalization or assembly, requires an instruction set including hashing functions over strings of a 2-bit alphabet. The energy dissipation between these two instruction sets would be wildly different, thus providing opportunities for value creation by specializing the ISA of the KPU tailored to classes of algorithms. In particular, ISAs centered around hashing would do well in genomics/proteomics, but hashing is also key in security applications, and database applications. For FDM, FEM, and FVM, instruction sets optimized for interpolations and resampling would optimize performance per Watt. Signal processing, image processing, and sensor processing would all benefit from custom ISAs.

Input/Output Path

As the KPU provides better performance per Watt as compared to multi-core and many-core Stored Program Machines, or SPMs, it will frequently be used for real-time processing of signal processing paths. Power efficiency is important in these applications, as is the ability to match processing time with data input rates. This means that there will be opportunities to optimize the data path between sensors or networks or devices to directly feed into the streamers of the KPU. Secondly, the streamers also orchestrate the serialization of input, intermediate, and output data to and from Random Access Memory, or RAM. When this RAM is of the dynamic type, that is DRAM, access patterns of said DRAM favor page locality. This provides an opportunity to imbue the streamers with page awareness, so that caching is able to be used to accumulate page coherent data for more efficient writeback to DRAM, or for more efficient input stream generation from DRAM to fabric streams. Thirdly, for certain data structures, in particular, vector and matrices, dense and sparse, as well as trees and lists, the structure of those data structures provide a rich ground for micro-architecture optimization. For example, a matrix descriptor is used by the streamers to derive data streams to and from memory. For sparse matrices, special index structures are used, to minimize memory bandwidth and thus maximize performance for a given DRAM technology. Fourthly, when we have specific functional unit micro-architectures, such as SIMD units that can do four floating point operations per instruction, the data stream should match that capability. This means that the streamers work in concert with the micro-architecture of the functional units. SIMD floating point units are one example, string and hash operators in text or genome/proteome algorithms would also provide new opportunities for optimizations.

Algorithms

As each algorithm needs to be transformed into a system of affine recurrence equations, and clever spatial placements and alignments of the domains are important for good performance, each new domain flow algorithm has the potential to be a method and apparatus to solve that problem. Since a domain flow program really is a physical embedding, it represents an apparatus. Intricate space and time constraints could make one system of recurrence work well and another, functionally the same, perform poorly. Secondly, algorithms would also combine with ISAs and I/O optimizations for very unique and optimized machines.

Compilation and Scheduling Optimizations

Given a system of affine recurrence equations, the compiler analyzes the amount and structure of the concurrency inherent in the algorithm. This is used to select good time schedules and low contention spatial allocation on the fabric. Simple algorithms are able to be used to select space and time projections. The core algorithms are able to be highly parallel and allow selection of simple linear combinations of the dependency vectors. More complicated, phased execution patterns are able to be used, for which these simple methods are not sufficient for completely automated compilation.

Processing Elements (PEs)

The PEs of the KPU are small processors including a CAM, an instruction scheduling/dispatch queue, one or more functional units, and a router that is able to generate affine routing vectors. The PE micro-architecture has many opportunities for continued innovation. For example, clever SIMD functional units for floating point, integer, and string operations, and instruction chaining where results are forwarded to other functional units without the need to go through the CAM or router. This is particularly interesting for composite instructions, such as, hashing functions, linear interpolations, or lerps, and other higher order functions useful in FVM, FEM, FDM, and BEM. Discrete event mathematics such as Lattice Boltzmann Methods, or complex approximation techniques used in FMM, are interesting methods and machines.

Processing Fabric

The processing fabric can exhibit global functional operators, such as broadcasts, and reductions, such as Fetch-and-Add and similar methods. These global operators would be driven by instruction sets that are managed and maintained by the fabric, not the individual processing elements. Secondly, as the ability to integrate larger and larger fabrics with potentially tens of thousands of processing elements, the need for fault tolerance of processing elements and the fabric increases. Since an important aspect of the core KPU engine is that locally, fine-grain dependencies are invariant to the resource contention demands of the input data set, dealing with PE failures is going to be difficult and thus solutions to the fault tolerance problem would be significant innovations. BIST testing and reconfigurability techniques to identify, and isolate, faulty processing or storage elements is applicable to the KPU chips. In some implementations, instead of one big KPU fabric, a chip is made up of many, smaller fabrics that is able to efficiently communicate data streams to each other. This would also be a micro-architecture organization to optimize multiple communicating kernels where each kernel would optimize space, time, and ISAs for the fabric and processing elements.

Program Storage and Management

The density of a domain flow program is very high. That is, very large and intricate parallel computations can be expressed in a hundred bytes or less. As more complex applications would chain multiple of such parallel kernels, the micro-architecture optimizes to chain and cache these program descriptions. Caching would be used to efficiently recall a previous kernel, and chaining would be used to avoid having to serialize intermediate data to and from memory, thus improving performance.

Circuits

Power management techniques that identify idle subsets of the fabric could shut down these resources to lower operating power consumption. Secondly, the core KPU engine is a data driven engine, so it could be implemented as a pure asynchronous execution pipeline. Micro-architectural implementations around signal settling Muller C-element pipelines or micro-pipelines could offer low power implementations of the KPU in embedded applications.

Field Programmable Gate Arrays

As a domain flow program concept provides an opportunity to optimize the ISA of the processing elements and the fabric, FPGA implementations of the KPU would make it possible to switch fabrics and instruction sets during the execution of the application. This could lead to workload-optimized servers and embedded processors.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A computing device comprising:
   a memory for storing data and a domain flow program; and
   a processor fabric, coupled to the memory, for processing domain flow programming information via one or more processing elements that match data tokens in the domain flow program.

2. The device of claim 1 further comprising data streamers configured for sending data streams to a crossbar.

3. The device of claim 2 wherein the one or more data streamers have page awareness so that caching is used to accumulate page coherent data for efficient writeback to DRAM or for efficient input stream generation from DRAM to fabric streams.

4. The device of claim 2 wherein a data structure descriptor is used by the one or more data streamers to derive data streams to and from the memory.

5. The device of claim 4 wherein for sparse matrices, index structures that use hierarchical blocks to enable n-bit indices are used to minimize memory bandwidth and maximize performance for a DRAM.

6. The device of claim 5 wherein the n-bit indices comprise 8-bit indices.

7. The device of claim 2 further comprising a controller configured for requesting the domain flow program including presenting a read request to a memory controller which translates the read request to a memory request and returns the data to the controller.

8. The device of claim 1 wherein a crossbar is further configured for routing data streams to rows or columns in the processor fabric.

9. The device of claim 8 wherein the processor fabric is further configured for producing output data streams.

10. The device of claim 9 wherein the output data streams are written to the memory by traversing through a crossbar to one or more data streamers that associate memory addresses to the data streams according to a data structure descriptor definition and whereupon the data streams are presented to a memory controller which writes the data streams into the memory.

11. The device of claim 10 wherein the one or more data streamers are further configured for sending notifier events to the memory controller once the one or more data streamers identify completion of a computational task.

12. A method comprising:
   configuring a processor fabric comprising one or more processing elements to execute a single assignment program defined by a coupled set of affine recurrences equations based on programming information.

13. The method of claim 12 further comprising utilizing data streamers that have page awareness so that caching is used to accumulate page coherent data for efficient writeback to DRAM or for efficient input stream generation from DRAM to fabric streams.

14. The method of claim 13 wherein a data structure descriptor is used by the data streamers to derive data streams to and from a memory.

15. The method of claim 13 wherein a data path between a sensor, a network or a device to the data streamers is optimized.

16. The method of claim 13 wherein the data streamers utilize a multidimensional data stream, wherein the multidimensional data stream has more than two dimensions.

17. The method of claim 12 wherein for sparse matrices, index structures are used to minimize memory bandwidth and maximize performance for a DRAM.

18. The method of claim 12 further comprising pushing a write command from the processor fabric to a memory controller.

19. The method of claim 12 wherein the operations include integer, genomic strings, floating point, non-integer or non-floating point.

20. A processor fabric for processing domain flow programming information comprising:
   a first set of processing elements; and
   a second set of processing elements which communicate with the first set of processing elements, wherein the first set of processing elements and/or the second set of processing elements match data tokens belonging to a same single assignment equation specified in a domain flow program.

21. The processor fabric of claim 20 wherein the first set of processing elements and/or the second set of processing elements process an instruction set architecture configured for a specific class of algorithms.

22. The processor fabric of claim 21 wherein the specific class of algorithms comprise hashing algorithms.

23. The processor fabric of claim 21 wherein the specific class of algorithms comprise optimizations for interpolations and resampling.

24. The processor fabric of claim 20 wherein the first set of processing elements and/or the second set of processing elements are further configured for receiving multidimensional data streams and producing output data streams.

25. The processor fabric of claim 24 wherein the output data streams are written to a memory by traversing through a crossbar to data streamers that associate memory addresses to data streams according to a data structure descriptor definition and whereupon the data streams are presented to a memory controller which writes the data streams into the memory.

26. The processor fabric of claim 25 wherein the data streamers are further configured for sending notifier events to the controller once the streamers identify completion of a computational task.

27. The processor fabric of claim 20 wherein the first set of processing elements and/or the second set of processing elements recognize a spatial tag of a computational event and take action under control of the domain flow program.

28. The processor fabric of claim 27 wherein the action taken includes comparing a signature of an incoming data token with signatures of instruction tokens that accumulate in the first set of processing elements and/or the second set of processing elements, and extracting the data token from an internal network if there is a match.

29. The processor fabric of claim 20 wherein the domain flow program evolves as multi-dimensional data streams match up with the first set of processing elements and/or the second set of processing elements and produce new multi-dimensional data streams.

30. The processor fabric of claim 20 wherein the first set of processing elements and/or the second set of processing elements each include a content addressable memory, an instruction scheduling/dispatch queue, one or more functional units, and a router configured to generate affine routing vectors.

31. The processor fabric of claim 20 wherein the processor fabric manages and maintains global operators.

32. The processor fabric of claim 20 wherein the processor fabric implements testing and reconfiguring to identify and isolate a faulty processing element of the first set of processing elements and/or the second set of processing elements or a faulty storage element.

33. The processor fabric of claim 20 wherein the processor fabric is implemented on a chip with one or more additional processor fabrics which are able to communicate data streams to each other.

34. The processor fabric of claim 20 wherein the first set of processing elements and/or the second set of processing elements each comprise a Single Instruction Multiple Data (SIMD) unit configured to process a plurality of operations per instruction.

35. The processor fabric of claim 20 wherein the operations include integer, genomic strings, non-integer or non-floating point.

* * * * *